United States Patent [19]
Kaufman et al.

[11] Patent Number: 4,878,219
[45] Date of Patent: Oct. 31, 1989

[54] METHOD AND APPARATUS FOR NODES IN NETWORK TO AVOID SHRINKAGE OF AN INTERFRAME GAP

[75] Inventors: Charles W. Kaufman, Northboro; Mark F. Kempf, Stow; Jerry D. Hutchison, Littleton, all of Mass.

[73] Assignee: Digital Equipment Corporation, Maynard, Mass.

[21] Appl. No.: 187,208

[22] Filed: Apr. 28, 1988

[51] Int. Cl.⁴ .......................... H04J 3/02; H04J 3/24; H04B 3/36

[52] U.S. Cl. .................................... 370/97; 370/85.5; 370/94.1

[58] Field of Search ....................... 370/79, 85, 86, 89, 370/94, 95, 97, 100, 101, 108, 13; 375/106, 3, 4; 455/7, 9, 18

[56] References Cited

U.S. PATENT DOCUMENTS

| | | |
|---|---|---|
| 4,058,672 | 11/1977 | Crager et al. . |
| 4,058,838 | 11/1977 | Crager et al. . |
| 4,195,351 | 3/1980 | Barner et al. . |
| 4,423,482 | 12/1983 | Hargrove et al. . |
| 4,595,911 | 6/1986 | Kregness et al. . |
| 4,606,023 | 8/1986 | Dragoo ................................ 370/94 |
| 4,612,541 | 9/1986 | Ohnishi . |
| 4,654,782 | 3/1987 | Bannai et al. . |
| 4,663,748 | 5/1987 | Karbowiak et al. . |
| 4,674,086 | 6/1987 | Szczepanek et al. . |
| 4,692,894 | 9/1987 | Bemis . |
| 4,696,001 | 9/1987 | Gagliardi et al. . |
| 4,703,486 | 10/1987 | Bemis . |

Primary Examiner—Douglas W. Olms
Assistant Examiner—Wellington Chin
Attorney, Agent, or Firm—Finnegan, Henderson, Farabow, Garrett, & Dunner

[57] ABSTRACT

An output controller in a repeater node for controlling data transfers in a data communication system in which each node is operated by an independent local clock. Nodes will occasionally delete idle bytes from a preamble to recenter an elasticity buffer. The output controller performs a process that requires the elasticity buffer to be progressively more full before deleting another idle byte from the preamble. Transmission of the start of a subsequent frame is delayed and additional idle bytes are transmitted when the number of idle bytes being transmitted is at or below a certain threshold. Multiple thresholds are utilized so that the amount of the delay can be adjusted.

60 Claims, 8 Drawing Sheets

METHOD AND APPARATUS FOR NODES IN NETWORK TO AVOID SHRINKAGE OF AN INTERFRAME GAP

FIELD OF THE INVENTION

This invention is related to networks that transfer frames of data through repeater nodes, and in which each node connected to the network is operated by an independent clock.

BACKGROUND OF THE INVENTION

In the field of data communications, data is often transmitted from one node (station) to another through a network of nodes that operate using their own independent clocks. Use of independent clocks in the nodes requires a system for ensuring that data corruption will not occur when frames of data are transmitted from a source node to a destination node through a number of repeater nodes. One method commonly employed for preventing data corruption in such networks is the use of an elasticity buffer at each node.

An elasticity buffer is a first-in first-out storage device including a number of storage elements. In the elasticity buffer, bytes of data enter and exit at different rates corresponding to the different frequency of the clock used by the upstream transmitting node compared with the local clock frequency used in the receiving node. Elasticity buffers are required even though data transfer rates are nominally the same because independent clocks in the nodes will differ in frequency by some known tolerance.

Data is stored in the elasticity buffer as it arrives from an upstream node, and is removed from the buffer for transmission to a downstream node at a rate determined by a local clock in the node. If the local clock for the node is slower than that of the upstream node, the buffer will become more and more full as the bytes in a frame are transmitted through the node. If the local clock is faster than that of the upstream node, the buffer gradually empties of all data.

The elasticity buffer in a repeater node between a source node and a destination node must include enough storage elements to ensure it will not become full before the last byte in a frame has been transmitted to a downstream node. If the buffer fills before the repeater node has transmitted the last byte to the downstream node, the buffer cannot store additional bytes being transmitted from an upstream node without corrupting previously received data that has not yet been transmitted to the downstream node.

Furthermore, there must be a minimum delay at the beginning of a frame before the elasticity buffer in the repeater node begins to output the first byte received from the upstream node. Without such an initial delay, a repeater node with a relatively fast clock will empty its elasticity buffer and will attempt to transmit bytes to the downstream node before they have been received from the upstream node. Therefore, it is important for the elasticity buffer to be "recentered" at the beginning of transmission of every frame to maintain the necessary delay that will prevent this from occurring.

These principles apply to various types of wide and local area networks, including any packet data network which connects many repeater nodes that involves point-to-point clocking. Examples include nodes connected to a token ring network or to an Ethernet network connected with multiple repeaters.

A ring network consists of a set of nodes (stations) logically connected as a serial string of nodes and transmission media to form a closed loop. Information is transmitted sequentially, as a stream of suitably encoded symbols, from one active node to the next. Each node generally regenerates and repeats each symbol and serves as the means for attaching one or more devices to the network for the purpose of communicating with other devices on the network.

A network of particular applicability is the fiber distributed data interface (FDDI), which is a proposed American National Standard for a 100 megabit per second token ring using an optical fiber medium. The characteristics of FDDI networks are described in detail by Floyd E. Ross in "FDDI—A Tutorial," *IEEE Communications Magazine*, Vol. 24, No. 5, pp. 10–17 (May 1986), which is hereby incorporated by reference.

Information is transmitted on an FDDI ring network in frames using a four of five group code, with each 5-bit code group being called a symbol. Of the 32 member symbol set, 16 are data symbols each representing four bits of ordered binary data, three are used for starting and ending delimiters, two are used as control indicators, and three are used for line-state signaling recognized by physical layer hardware. Each byte corresponds to two symbols or ten bits. (The term byte is used throughout the specification as a convenient way to refer to a unit of data; the functioning of the invention is not limited to any particular data unit, and other units of data, such as symbols and bits, are not excluded.)

The data transmission rate is 100 megabits per second for FDDI. A 125 megabaud transmission rate is required because of the use of a four-of-five code on the optical fiber medium. The nature of the clocking limits data frames to a maximum length of 4,500 bytes i.e., 9,000 symbols or 45,000 bits). An FDDI network consists of a theoretically unlimited number of connected nodes.

In FDDI networks, every transmission of a frame is preceded by a preamble field, which consists of idle line-state bytes (symbols). In FDDI, an idle line-state symbol corresponds to the 5-bit code group 11111. At the beginning of the frame, the preamble field of idle bytes is followed by a starting delimiter field, which consists of a two-symbol sequence JK that is uniquely recognizable independent of previously established symbol boundaries. The starting delimiter field establishes the symbol boundaries for the content that follows. The 5-bit code group corresponding to the symbol J is 11000, and the code group corresponding to the symbol K is 10001.

In an FDDI ring, a media access control entity in each node recognizes idle bytes as a preamble preceding a frame. Although it is possible to design a network in which no gap at all is provided between frames, in reality, designers of devices connected to the network prefer to have a preamble including one or more idle bytes separating each frame. The use of the preamble provides each node with a certain amount of time to recover from the preceding frame before having to respond to a subsequent frame. For example, this time period can be used for recentering the elasticity buffer in the node.

In an FDDI network, when a frame is generated in a source node and transmitted to the first downstream node, the frame will have a preamble including eight idle bytes. Furthermore, the standard for FDDI rings provides that the media access control entity in a repeater node is not required to recognize any frame having a preamble that is smaller than six idle bytes in length.

For FDDI, the nominal clock rate is 125 megahertz but a frequency tolerance of plus or minus 0.005% is allowed. The maximum frame size is 4,500 bytes. Given these constraints, it is readily understood that passage of a single frame may result in the elasticity buffer in a repeater node filling or emptying at the rate of 4.5 bits per frame because of the maximum possible difference in clock frequencies in consecutive nodes in the network.

As has been described previously, the elasticity buffer in each node in a network compensates for any differences in rates of the clocks for consecutive nodes in the network. When recentering of the elasticity buffer occurs before a subsequent frame is repeated by a node, the node will either insert or delete bytes from the total number of bytes it transmits to the downstream node, depending on whether the clock in the upstream node is slower or faster than the local clock for the node. By providing a preamble before each frame including at least a minimum number of idle bytes, the elasticity buffer can be recentered without any loss of data by only allowing addition or deletion of idle bytes in the preamble separating every pair of frames.

Therefore, in order to prevent allowable clock frequency differences from causing the elasticity buffer in a node from completely filling or emptying, the repeater node recenters its elasticity buffer by either expanding or shrinking the size of the preamble for the subsequent frame. Thus, one idle byte may be inserted in a preamble by a fast repeater node when it recenters to prevent its elasticity buffer from emptying, while one idle byte may be deleted by a slow repeater node when it recenters its elasticity buffer in order to prevent it from filling.

However, a significant problem arises when a repeater node recenters its elasticity buffer without regard to the number of idle bytes contained in the preamble for the subsequent data frame. If a minimum number of idle bytes do not separate the end of the preceding data frame from the start (i.e., the starting delimiter) of the subsequent data frame, downstream nodes in the network are not required to recognize the frame. As a result, there is a loss of data. Therefore, frames of data are lost in a network in which some method or apparatus is not provided for maintaining an interframe gap. Even when the minimum number of idle bytes separating frames is zero, deletion of bytes by the node must be limited to prevent two frames from actually colliding with each other.

Thus, in a series of nodes with randomly distributed clocks, some nodes will occasionally delete idle bytes from a preamble in order to recenter an elasticity buffer that fills too rapidly. If the nodes in the network ignore the size of the preamble when they delete idle bytes, a number of idle bytes between a particular pair of frames may be deleted, making it impossible for a downstream node to repeat the second frame and continue the transmission.

The probability at which frame loss occurs due to the preamble not containing a minimum number of idle bytes depends on several factors: (1) the most critical factor is the size of the units in which idles are added or deleted by the nodes to the preamble between two frames (i.e., in units of bytes, symbols, or bits); (2) the number of nodes in the network; (3) the minimum number of idle bytes required by each repeater node in order to recognize a subsequent frame; and (4) the distribution of clock speeds.

Analysis has shown that it is possible for half of all maximum length frames to be lost by a fifth repeater node in a situation where clocks in an FDDI ring alternate between the minimum and minimum allowable speeds, idles are added or deleted from the preamble in units of bytes, the nodes require a minimum of six idle bytes between frames, and the size of the original preamble is eight idle bytes. An illustration of the problem is shown in Table I, which lists the number of idle bytes remaining between frames as the frames are transmitted from node 1 to node 6. The relatively fast nodes must add an idle byte every two maximum length frames, whereas the relatively slow stations must delete an idle byte every two maximum length frames. The preambles transmitted from a number of nodes could therefore follow the following pattern:

TABLE I

| Frame: | 1 | 2 | 3 | 4 | 5 |
|---|---|---|---|---|---|
| Node 1 (fast) | 8 | 8 | 8 | 8 | 8 |
| Node 2 (slow) | 8 | 7 | 8 | 7 | 8 |
| Node 3 (fast) | 9 | 7 | 9 | 7 | 9 |
| Node 4 (slow) | 9 | 6 | 9 | 6 | 9 |
| Node 5 (fast) | 10 | 6 | 10 | 6 | 10 |
| Node 6 (slow) | 10 | 5 | 10 | 5 | 10 |

This example shows that downstream nodes may reject the second and fourth frames because those frames contain inadequate preambles, including only five idle bytes between frames.

In a situation in which: (1) idles are added or deleted in units of symbols; (2) there is a pseudo-random distribution of clock frequencies among nodes; (3) there are 101 nodes; (4) the minimum required number of idle symbols between frames is twelve; and (5) frames having the maximum length of 9,000 symbols are being transmitted; a simulation of the problem revealed that there was a probability that more than one out of ten frames would be lost.

Generally, this problem with the operation of elasticity buffers is related to the shrinking of preambles due to cumulative roundoff error. When an FDDI source node creates a frame, it is transmitted with a preamble of eight idle bytes (16 idle symbols). The network has a maximum frame size of 4,500 bytes and a clock tolerance of plus or minus 0.005%, so that a node will have to add or delete no more than 4.5 bits when it recenters its elasticity buffer following transmission of a frame. Although this slippage of 4.5 bits reflects the maximum clock frequency differences from the nominal frequency for all stations in the network, this does not prevent preambles from falling outside the predicted range of 75.5 to 84.5 bits. Nodes do not add or delete fractions of bits from frames repeated to downstream nodes because of the technical complexity and the resulting addition to the jitter seen at the downstream node due to a frequency shift for the duration of one bit. Instead, the node rounds the number of bits it adds or deletes to the nearest whole bit, and these roundoff errors can accumulate along the network. In the worst case, a preamble of 80 bits can shrink to nothing after being repeated by 80 nodes.

However, the scenario described in the preceding paragraph is extremely unlikely. Although the maximum roundoff error is almost one bit, the average roundoff error per node is about 0.25 bits, and the direction of the error is random. Therefore, cumulative roundoff error is best estimated as a random walk with a step of 0.25 bits per node. For a ring having 1,000 nodes, this results in a one in 2,000,000 probability that a preamble will randomly walk to zero bits.

Unfortunately, the problem of shrinking preambles is made much more likely by two factors. First, standards for nodes connected to a network such as FDDI do not specify a maximum roundoff error, and designers therefore plan implementations of nodes that round to the nearest byte (10 bits) or symbol (5 bits). This increases the size of each step in the random walk, thereby dramatically increasing the probability of collisions between consecutive frames. Second, as discussed above, standards for certain networks may not require that the repeater node process frames preceded by a preamble including less than a relatively large number of idle bytes or symbols (e.g., six bytes for FDDI). Thus, designers of nodes to be connected to an FDDI network are relying on a six byte preamble of idles being preserved with high probability. This means that only one-quarter of the initial preamble of eight bytes for an DDI network is available for shrinkage due to recentering of the elasticity buffers in a number of nodes.

A process is thus required which can be reasonably be implemented and which will have an acceptable frame loss range for networks containing a large number of nodes. The consensus in the industry is that a frame loss rate of one frame in 10 billion is acceptable for 1000 nodes connected in an FDDI network.

Thus, there is a need for a method and apparatus for avoiding unnecessary shrinkage of a gap between two frames when a number of nodes in a network recenter their elasticity buffers.

SUMMARY OF THE INVENTION

It is an object of the present invention to overcome the problems and disadvantages described above relating to the deletion of bytes by nodes having independent clocks that are connected in networks and which adjust for timing differences between nodes by adding and deleting bytes from a data stream rather than by adjusting the independent clocks. It is therefore desirable to provide a method and apparatus for maintaining an interframe gap that is characterized by a simple distributed process of general utility.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, an output controller is provided in a repeater node for controlling data transfers in a data communication system, the data communication system including a plurality of nodes coupled in a network for transferring frames of data from a source node to a destination node through a plurality of repeater nodes, wherein the repeater node receives a plurality of bytes in a frame from an upstream node, stores the plurality of bytes in an elasticity buffer, and transmits the plurality of bytes in the frame to a downstream node, wherein a last byte of a preceding frame and a starting delimiter for a subsequent frame are separated by a preamble including at least a minimum number of idle bytes, wherein each node in the network is operated by an independent local clock, and wherein the repeater node includes an input controller. The output controller includes means coupled to the elasticity buffer for transmitting bytes to the downstream node in response to a local clock signal; means coupled to the transmitting means for indicating an idle byte is being transmitted to the downstream node; means coupled to the idle byte indicating means for counting the number of idle bytes being transmitted to the downstream node; control means coupled to the counting means and responsive to an indication from the input controller of receipt of the starting delimiter for the subsequent frame, for asserting a control signal to enable transmission of the starting delimiter to the downstream node in response to an idle byte count indicating that more than a threshold number of idle bytes is being transmitted to the downstream node, and for not asserting the control signal to delay transmission of the starting delimiter in response to an idle byte count indicating that the threshold number of idle bytes is being transmitted to the downstream node; and means coupled to the control means and the transmitting means for transmitting an additional idle byte to the downstream node in response to deassertion of the control signal at times when an equal signal is received indicating the starting delimiter is ready to be output.

The accompanying drawings, which are incorporated in and constitute a part of this specification, illustrate one preferred embodiment of the invention, and, together with the description, serve to explain the principles of the invention.

DESCRIPTION OF A PREFERRED EMBODIMENT

Reference will now be made in detail to one of the preferred embodiments of the invention, an example of which is illustrated in the accompanying drawings.

Figure 1:
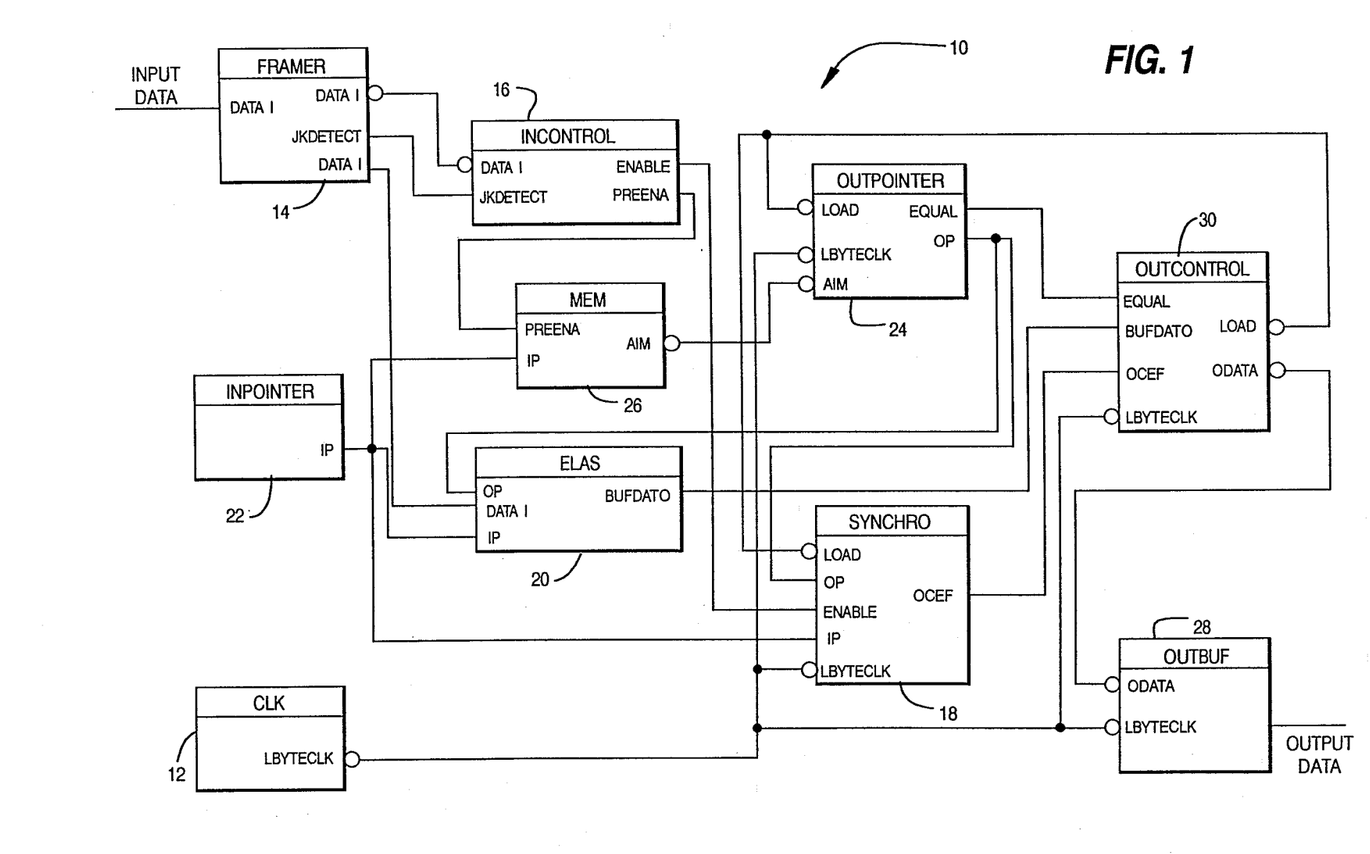
FIG. 1 is a block diagram of a repeater node.

The preferred embodiment of the repeater node is shown in FIG. 1 and is represented generally by the numeral 10. The repeater node is provided in a data communication system including a number of nodes coupled in a network for transferring frames of data from a source node to a destination node through the repeater node. The repeater node receives a number of bytes in a frame from an upstream node and transmits the bytes in the frame to a downstream node. The last byte in the preceding frame is separated by a preamble from the start of a subsequent frame, which is designated by a starting delimiter. The preamble includes at least a minimum number of idle bytes. In the network, each node is operated by an independent local clock.

In accordance with the invention, the repeater node includes means for generating a local clock signal. As embodied herein, the local clock signal is generated by local clock 12 and comprises a local byte clock signal, which is a 12.5 megahertz TTL-compatible output driven by a local oscillator circuit in clock 12. The local byte clock signal is used to drive various parts of repeater node 10, such as a synchronizer, elasticity buffer, output pointer, output controller, and output buffer. A recovered byte clock signal is provided from a clock recovery chip (not shown) based on the clock derived from received data from the upstream node, and is used to drive a framer, input pointer, temporary address memory, input controller, and elasticity buffer.

The repeater node of the present invention includes means for receiving a byte transmitted from the upstream node. Preferably, this means is provided by framer 14. Input data is clocked into framer 14 one symbol at a time using both rising and falling edges of the recovered byte clock signal, and buffer-in data is clocked out of data framer 14 one byte at a time with each rising edge of the recovered byte clock signal. In the preferred embodiment, comparator circuits in framer 14 continuously check for the start of a subsequent frame, which is determined by the presence of a starting delimiter (corresponding to a JK symbol pair for an FDDI network).

In accordance with the invention, repeater node 10 includes input controller means coupled to the receiving means for indicating receipt of the starting delimiter for the subsequent frame. As shown in FIG. 1, the input controller means may include input (write) controller 16 and a synchronizer 18. When repeater node 10 begins to receive the start of a subsequent frame, a starting delimiter detect signal is asserted by the comparator circuits in framer 14 and is sent to input controller 16. A function of input controller 16 is to recognize the normal elasticity buffer reset conditions, and perform what is necessary to initiate the elasticity buffer reset. Input controller 16 monitors buffer-in data that is provided by framer 14. Whenever 16 consecutive idle bytes are detected, or receipt of the starting delimiter is detected, a reset condition is recognized by input controller 16. On the falling edge of a recovered byte clock signal following detection of a reset condition, an enable signal is asserted by input controller 16 and is sent to synchronizer 18. In the preferred embodiment, synchronizer 18 is a dual rank synchronizer that receives the enable signal and retimes it in accordance with the local byte clock signal. As a result, synchronizer 18 creates an output controller enable flag (OCEF) signal used to initiate state machines in an output controller.

In accordance with the present invention, the repeater node includes elasticity buffer means, coupled to the receiving means and including a number of storage elements, for storing a number of bytes received from the upstream node, and for sequentially outputting each stored byte in first-in, first-out order in response to the local clock signal. As embodied herein, the elasticity buffer means is provided by elasticity buffer 20. Preferably, 10-bit wide parallel data is independently written to and read from buffer 20 under the control of an input pointer 22 and an output pointer 24, respectively. Input pointer 22 is a free-running counter that is incremented by the recovered byte clock signal derived from received data. Output pointer 24 is a loadable counter that is incremented by the local byte clock signal. In the preferred embodiment described herein, both pointers operate in a circular fashion, such that each pointer returns to the beginning of buffer 20 after it reaches the end of elasticity buffer 20.

For purposes of the present invention, i.e., avoiding shrinkage of an interframe gap, the elasticity buffer means can be implemented in several other ways. For example, an elasticity buffer means into which data from the upstream node is input using the recovered byte clock signal can be followed by a shift register. A stored byte can be output from a last storage element in the register using the local byte clock signal. In order to delay output of a stored byte from such an elasticity buffer means, additional storage elements may be provided, and a multiplexer or other circuitry can be used to select one of the last storage elements in the register as the source of data being output from the register.

In the preferred embodiment of elasticity buffer 20, input pointer 22 and output pointer 24 are clocked by independent clocks, and therefore run asynchronously. On the rising edge of the recovered byte clock signal following assertion of the enable signal, buffer-in data from framer 14 is loaded into the storage element in elasticity buffer 20 that is currently being selected by an input pointer value (IP) signal from input pointer 22. On the same rising edge of the recovered byte clock signal, input pointer 22 is incremented. On each rising edge of the recovered byte clock signal, a new byte is loaded from framer 14 into elasticity buffer 20, and input pointer 22 is incremented. The input pointer value signal is stored in a temporary address memory 26 on the rising edge of the recovered byte clock signal immediately following assertion of the enable signal by input controller 16. Thus, temporary address memory 26 contains a stored input pointer address (AIM) that points to the storage element in elasticity buffer 20 containing the starting delimiter for a subsequent frame.

Output pointer 24 provides an output pointer value (OP) signal to elasticity buffer 20 in order to select the storage element which will provide the buffer-out data. At times when the output controller enable flag (OCEF) signal is not asserted, output pointer 24 simply increments the output pointer value on the next falling edge of the local byte clock signal.

As indicated previously, there must be a minimum delay at the beginning of a frame before elasticity buffer 20 begins to output the first byte received from the upstream node. Without such an initial delay, buffer 20 in node 10 may eventually empty if local clock 12 is faster than the recovered byte clock signal from the upstream node. Therefore, elasticity buffer 20 is recentered prior to transmission of a subsequent frame.

For an FDDI network, the tolerance in the frequency of the independent clocks allows a relative slippage of five bits between the input and output pointers. Elasticity buffer 20 must be able to absorb at least that amount of slippage. Therefore, in the preferred embodiment described herein, elasticity buffer 20 includes additional storage elements in order to store five additional bits in the event bytes are being received from an upstream node containing a faster local clock. The possible frequency differences also require that buffer 20 be recentered so that there is an initial delay of at least five bit times between storage of buffer-in data and transmission of buffer out data by buffer 20. However, input pointer 22 and output pointer 24 are responsive to independent clock signals and operate asynchronously. Therefore, depending on the relative transition times for each of the byte clock signals, output of the first byte corresponding to a subsequent frame may be delayed by an additional byte time (i.e., 10 additional bit times). Thus, when elasticity buffer 20 is recentered before a subsequent frame is transmitted to a downstream node, there will be an initial delay between five and fifteen bit times before buffer-out data corresponding to the subsequent frame is provided from elasticity buffer 20.

In accordance with the output controller and the repeater node of the present invention, there is provided means coupled to the elasticity buffer means for transmitting byes to the downstream node in response to the local clock signal. Preferably, this transmitting means includes an output buffer 28. On each falling edge of the local byte clock signal, output pointer 24 is incremented to the next storage element location and the data from the previous location is loaded into output buffer 28. (The buffer-out data actually goes from elasticity buffer 20 to an output controller, where the buffer-out data is ORed with a force signal, and output data is then provided to output buffer 28.) On each falling edge of the local byte clock signal, the output data is loaded into the input stage of output buffer 28. On the rising edge of a differently phased local byte clock signal, the output data is clocked into the output stage of output buffer 28 for transmission to the downstream node.

The repeater node of the present invention also includes means coupled to the elasticity buffer means for providing an equal signal to indicate the starting delimiter for the subsequent frame is ready to be output. As embodied herein, output pointer 24 can assert an equal signal. Assertion of the equal signal indicates that elasticity buffer 20 is ready to begin transmitting the first byte of the subsequent frame to the downstream node. The equal signal is asserted by output pointer 24 when the output pointer value (OP) signal matches the stored input pointer address (AIM) signal. This occurs only when the storage element in elasticity buffer 20 being selected by output pointer 24 to provide buffer-out data to buffer 28 contains the first byte (the starting delimiter) in the subsequent frame. Output pointer 24 is loaded with the stored input pointer address, which corresponds to the location of the starting delimiter for the subsequent frame, when repeater node 10 resets and recenters elasticity buffer 20.

In accordance with the invention, the repeater node includes an output controller. As shown in the FIG. 1 embodiment, the output controller may be provided by output (read) controller 30. Output controller 30 receives buffer-out data from elasticity buffer 20, the local byte clock signal, the output controller enable flag (OCEF) signal from synchronizer 18, and the equal signal from output pointer 24. In reSponse to these input signals, output controller 30 provides output data to output buffer 28, and asserts or deasserts an output pointer load enable (load) signal provided to output pointer 24.

Figure 2:
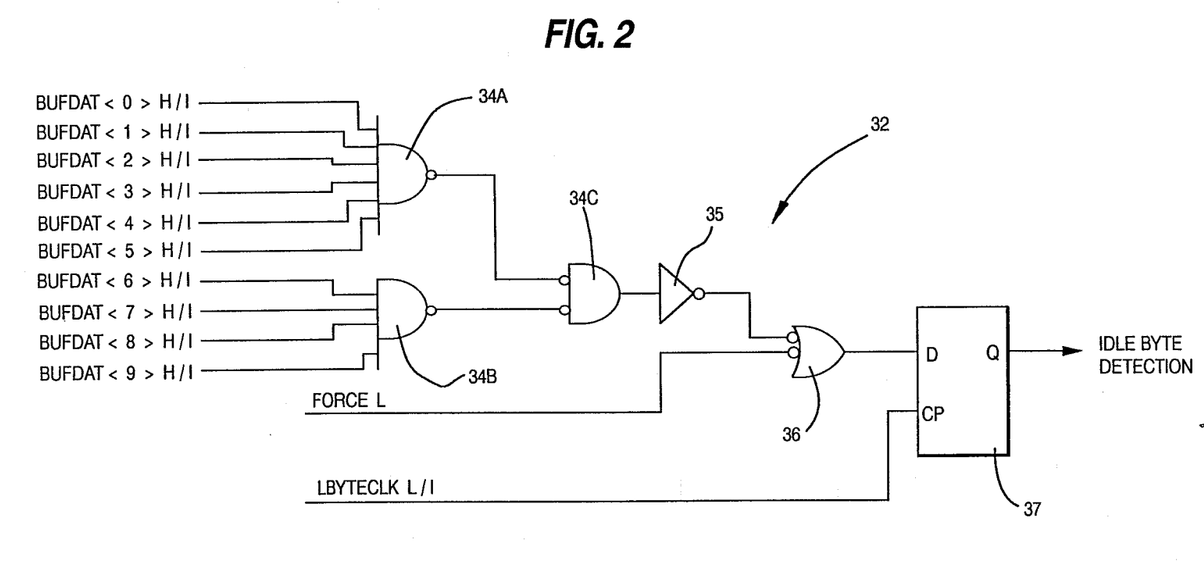
FIG. 2 is a schematic of idle detection circuitry.

In accordance with the present invention, the output controller includes means coupled to the transmitting means for indicating an idle byte is being transmitted to the downstream node. As embodied herein and shown in FIG. 2, output controller 30 includes idle detection circuitry 32. Circuitry 32 receives the buffer-out data from elasticity buffer 20. For an FDDI network, the 5-bit code group corresponding to an idle symbol corresponds to 11111. Therefore, an idle byte can be detected by inputting the buffer-out data to AND gates 34. In the preferred embodiment, output controller 30 can force an idle byte to be substituted for the buffer-out data by asserting a force signal. Therefore, the force signal is also monitored by idle detection circuitry 32 by inputting the force signal to an OR gate 36 along with the output from AND gates 34. OR gate 36 asserts an idle byte detection signal when an idle byte is being transmitted from output controller 30 and output buffer 28 to the downstream node. Preferably, the idle byte detection signal is first provided to an error filter state machine (not shown), whose purpose is to prevent output controller 30 from responding to any single errors that may occur during a string of consecutive idle bytes.

Figure 3:
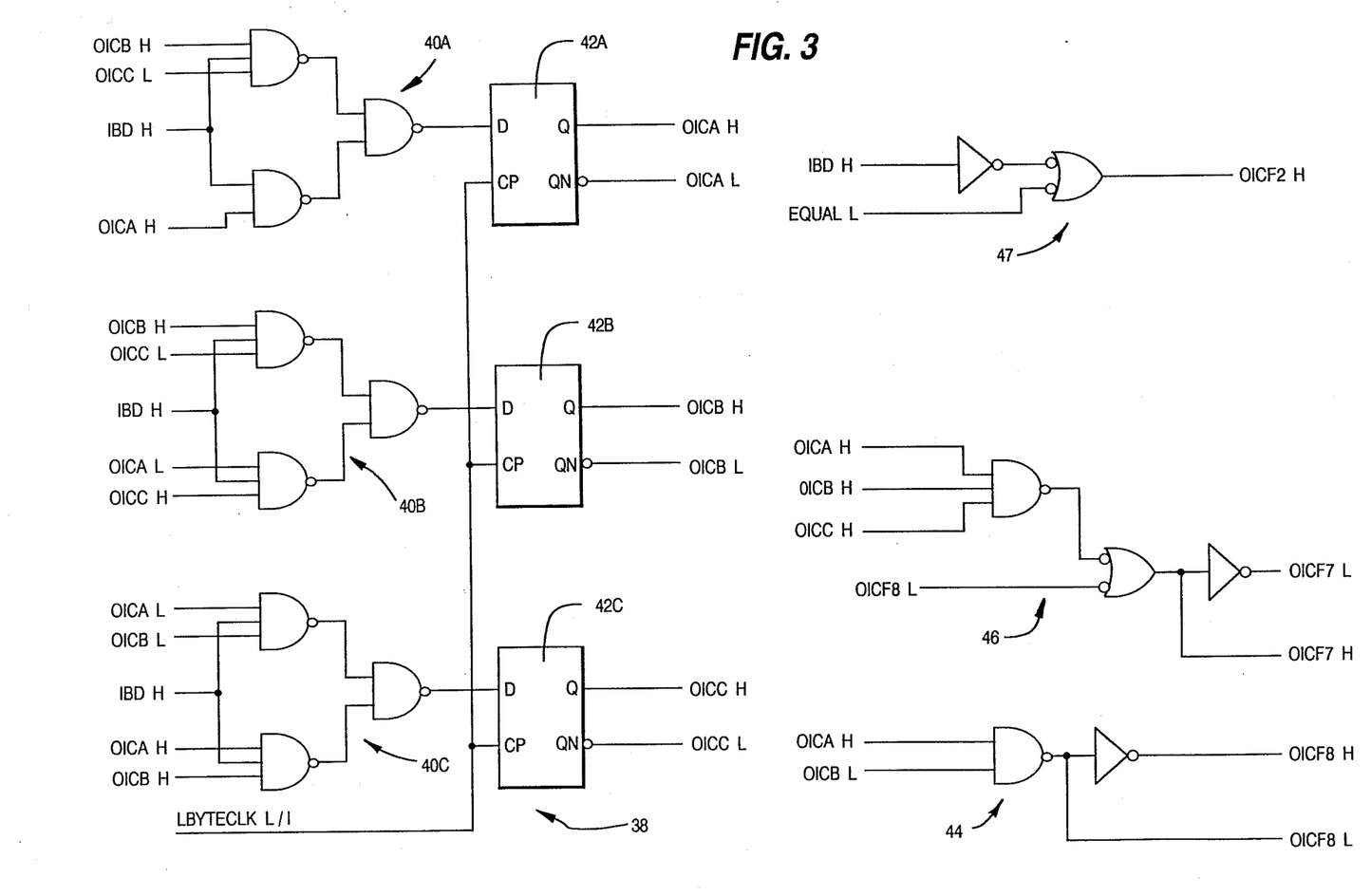
FIG. 3 is a schematic of an output idle counter.

The output controller of the present invention includes means coupled to the idle byte indicating means for counting the number of idle bytes being transmitted to the downstream node. Preferably, output controller 30 includes an output idle counter 38, as shown in FIG. 3. Output idle counter 38 is an eight state counter which keeps track of the number of successive idle bytes to output buffer 28. Whenever idle detection circuitry 32 detects idle bytes being output from elasticity buffer 20 or the assertion of the force signal, the idle byte detection signal is input to AND gates 40. As long as idle bytes are being transmitted to the downstream node, AND gates 40 provide outputs to three flip-flops 42 that enable incrementing of counter 38 on the following falling edge of the local byte clock signal. When counter 38 reaches the final state, it remains in that state, indicating that at least eight idle bytes have been transmitted to the downstream node. Output idle counter 38 is reset only when idle detection circuitry 32 indicates that idle bytes are no longer being transmitted to the downstream node. Each flip-flop 42 provides one bit in the 3-bit output idle count, which are referred to as output idle count (OIC) signals.

In the preferred embodiment, the output idle count signals are utilized by output controller 30 in determining the number of idle bytes that are being transmitted to the downstream node. As shown in FIG. 3, an output idle count flag 8 (OICF8) signal is asserted by logic 44 in output controller 30 whenever the output idle count signals indicate that eight or more idle bytes are being transmitted to the downstream node. Similarly, logic 46 in output controller 30 asserts an output idle count flag 7 (OICF7) signal whenever the output idle count signals indicate seven or more idle bytes are being transmitted to the downstream node.

In accordance with the invention, control means is provided that is coupled to the counting means and is responsive to an indication from the input controller means of receipt of the starting delimiter for a subsequent frame. The control means asserts a control signal to enable transmission of the starting delimiter to the downstream node in response to an idle byte count indicating that more than a threshold number of idle bytes is being transmitted to the downstream node. The control means does not assert the control signal and thereby delays transmission of the starting delimiter in response to an idle byte count indicating the threshold number of idle bytes is being transmitted to the downstream node. In a preferred embodiment, the control means asserts the control signal in response to an idle byte count indicating that more than a high threshold number of idle bytes is being transmitted to the downstream node. Preferably, the control signal is not asserted for a first time period in response to the idle byte count indicating that a low threshold number of idle bytes is being transmitted to the downstream node, and the control signal is not asserted for a second time period in response to the idle byte count indicating that the high threshold number of idle bytes is being transmitted to the downstream node.

As embodied herein, the control means performs a process that requires elasticity buffer 20 to be progressively more full before deleting another idle byte from the preamble preceding a subsequent frame. For a repeater node connected to an FDDI network, the minimum number of idle bytes between frames is six and the initial number of idle bytes provided between frames by a source node is eight.

In order to implement the preferred process, elasticity buffer 20 must include additional storage elements so that output controller 30 can wait an additional time period before having to delete another idle byte from the preamble. As embodied herein, implementation of the process requires additional storage elements increasing the range of elasticity buffer 20 by 40 more bits (four more bytes).

In selecting a process for avoiding unnecessary shrinkage of the interframe gap, a trade-off is made between lowering the probability of deletion of idle bytes resulting in the preamble having fewer than a minimum number of idle bytes, and increasing the size of elasticity buffer 20 and the amount of delay in transmission. In the preferred embodiment, a method and apparatus is provided that uses multiple thresholds in order to achieve the best results when these factors are considered.

Table II illustrates the use of multiple thresholds in the preferred embodiment of the invention:

TABLE II

| Number of Idle Bytes | Elasticity Buffer Delay in Bits |
|---|---|
| greater than 8 | 5-15 |
| 8 | 5-25 |
| 7 | 15-45 |
| 6 | 35-55 |
| less than 6 | 45-55 |

The decision of whether to add or delete an idle byte from the preamble is a function of the number of idle bytes being transmitted to the downstream node as well as the fullness of the elasticity buffer. The fewer the number of idle bytes being transmitted, the closer to overflow elasticity buffer 20 must be before another idle byte will be deleted. Using this process, elasticity buffer 20 is four bytes larger than would otherwise be necessary, the maximum node delay is increased by 320 nanoseconds (four bytes), and the average node delay is increased by 40 nanoseconds (five bits). If the process illustrated above is not utilized, the elasticity buffer delay will be at least 5-15 bits regardless of the number of idle bytes in the preamble being transmitted. In contrast, the illustrated process increases the size of the initial delay as the gap between frames becomes smaller.

Figure 4:
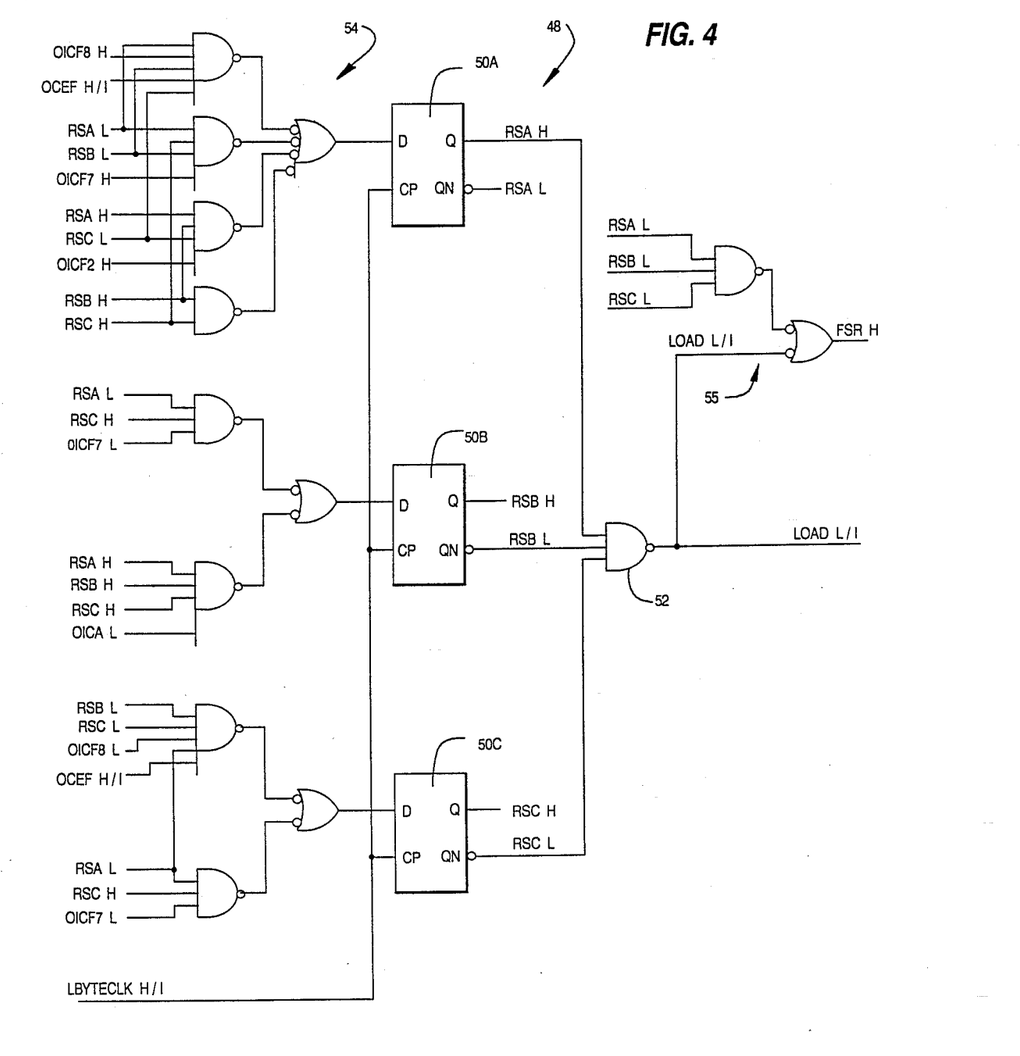
FIG. 4 is a schematic of a reset state machine.

Preferably, the control means of the present invention in output controller 30 is implemented by a reset state machine 48 which is shown in FIG. 4. Additionally, the process implemented by reset state machine 48 is illustrated by a state diagram in FIG. 5.

Reset state machine 48 is a six-state sequential machine which utilizes the number of idle bytes counted by output idle counter 38 to determine when to assert an output pointer load enable (load) signal. The output pointer load enable signal is provided by reset state machine 48 to output pointer 24 in order to load (reset) the output pointer value with the stored input pointer address provided by temporary address memory 26. The resetting of output pointer 24 causes selection of the storage element in elasticity buffer 20 containing the starting delimiter for the subsequent frame. Thus, in the preferred embodiment of the invention, the control signal corresponds to the output pointer load enable signal. Assertion of the load signal by reset state machine 48 enables transmission of the starting delimiter from elasticity buffer 20 to the downstream node.

As shown in FIG. 4, reset state machine 48 includes three flip-flops 50 that provide the three reset state bit (RS) signals that indicate the current state. The reset state bit signals are provided to an AND gate 52 which asserts the output pointer load enable signal when reset state machine 48 is in state 100. The inputs to flip-flop 50 are provided by logic 54, which is responsive to the output controller enable flag signal provided from synchronizer 18 and the output idle count and output idle count flag signals provided by output idle counter 38.

Figure 5:
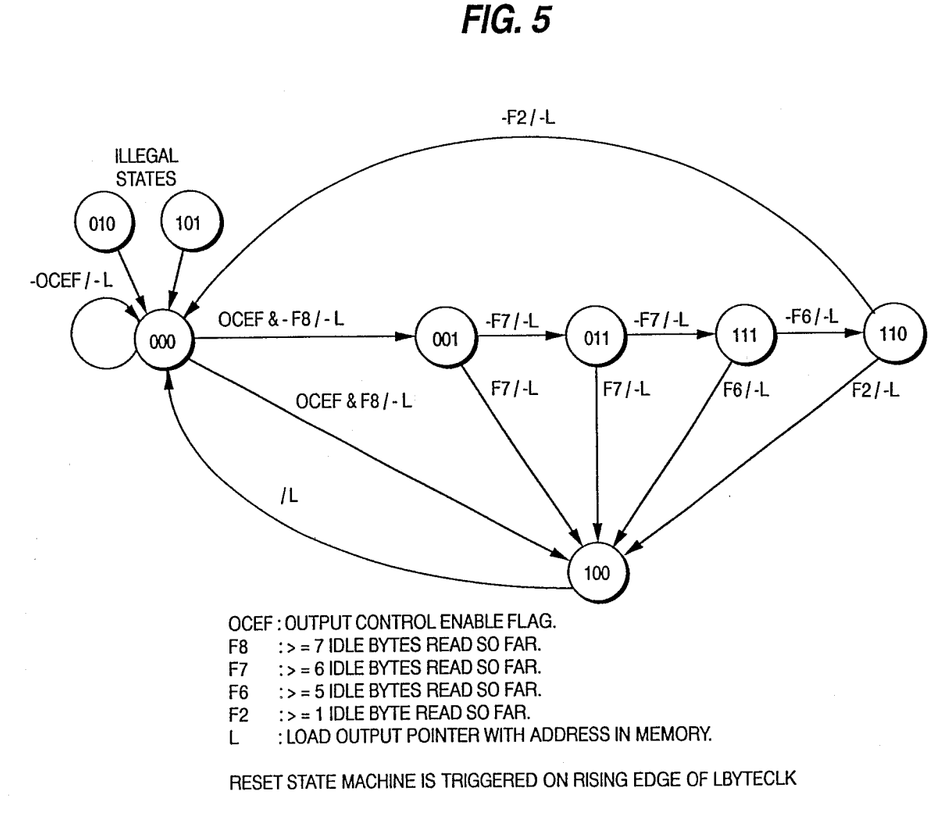
FIG. 5 is a state diagram for a reset state machine.

As shown in FIG. 5, reset state machine 48 usually loops in idle state 000 until the output controller enable flag signal is asserted. In response to assertion of OCEF, the output idle count signals are sampled on the next rising edge of the local byte clock.

When the OCEF signal is asserted and the output idle count flag 8 signal has been set, state machine 48 proceeds to state 100. As indicated previously, the OICF8 signal indicates that eight or more idle bytes are being transmitted to a downstream node. (Although only seven idle bytes have actually been detected at this time, an additional idle byte will be transmitted before reset state machine 48 can return to idle state 000.) During the reset state 100, the load signal is output to output pointer 24. Output pointer 24 is driven by the falling edge of the local byte clock signal and will therefore select the storage element containing the starting delimiter for the subsequent frame on the falling edge of the local byte clock signal following entry of reset state machine 48 into reset state 100. The count of eight idle bytes is more than a high threshold number of idle bytes, which is preferably set to equal seven bytes. Therefore, as shown in Table II, the minimum elasticity buffer delay remains at five bits, and transmission of the starting delimiter for the subsequent frame is not delayed by output controller 30.

When eight or more idle bytes are not being transmitted to the downstream node, reset state machine 48 proceeds from state 000 to state 001 in response to the OCEF signal indicating receipt of the starting delimiter for the subsequent frame. Reset state machine 48 remains in state 001 for one byte time and monitors whether the output idle count flag 7 signal is asserted indicating that seven idle bytes are being transmitted to the downstream node.

If seven idle bytes are being transmitted to the downstream node, state machine 48 proceeds from state 001 to reset state 100, and then performs in the manner previously described. When the high threshold number of seven idle bytes is being transmitted to the downstream node, the load signal is not asserted by output controller 30 to delay transmission for a second time period of the starting delimiter to the downstream node. Since reset state machine 48 has to proceed to state 001 before it enters the reset state 100, transmission of the starting delimiter is delayed for one additional byte time compared with a situation in which eight or more idle bytes are being transmitted. Thus, as shown in Table II, the minimum elasticity buffer delay is 15 bits when seven idle bytes are being transmitted.

If only six idle bytes are counted by output idle counter 38, reset state machine 48 proceeds from state 001 to state 011, where it remains for one byte time, and then proceeds to state 111, where it remains for an additional byte time. When the output idle count signals indicate that six idle bytes, which preferably corresponds to the low threshold number, are being transmitted to the downstream node, then reset state machine 48 can proceed from state 111 to reset state 100. Thus, in response to an idle byte count indicating that the low threshold number of six idle bytes is being transmitted to the downstream node, reset state machine 48 does not assert the load signal to delay transmission of the starting delimiter to the downstream node for a first time period longer than the second time period. Reset state machine 48 is required to enter two additional states before it enters reset state 100 and asserts the control signal. This corresponds to the process shown in Table II, in which an idle byte count of six results in a minimum delay that is two byte times longer than the minimum delay when seven idle bytes are being transmitted to the downstream node.

At times when output idle counter 38 indicates that fewer than six idle bytes are being transmitted to the downstream node, state machine 48 proceeds from state 111 to state 110, where it remains for one byte time. As long as two or more idle bytes are being transmitted to the downstream node, or if the output pointer value equals the stored input pointer address, reset state machine 48 will then proceed to reset state 100. In this situation, reset state machine 48 enters four additional states before proceeding from idle state 000 to reset state 100. Thus, when a lower threshold number of idle bytes equal to five or less is being transmitted to the downstream node, transmission of the starting delimiter is delayed for an additional byte time. As shown in Table II, the minimum elasticity buffer delay is 45 bits whenever fewer than six idle bytes are being transmitted to the downstream node.

In unusual situations, reset state machine 48 may leave initial state 000 and be in state 110, without detection of even one idle byte. This may occur if the input and output pointers have drifted far from their initial spacing. In this situation, data may be deleted by repeater node 10 if reset state machine 48 enters the reset state 100. Therefore, if one idle byte has not been detected, and if the output pointer value does not equal the stored input pointer address, state machine 48 proceeds directly from state 110 to the initial state 000, and no reset occurs.

Figure 6:
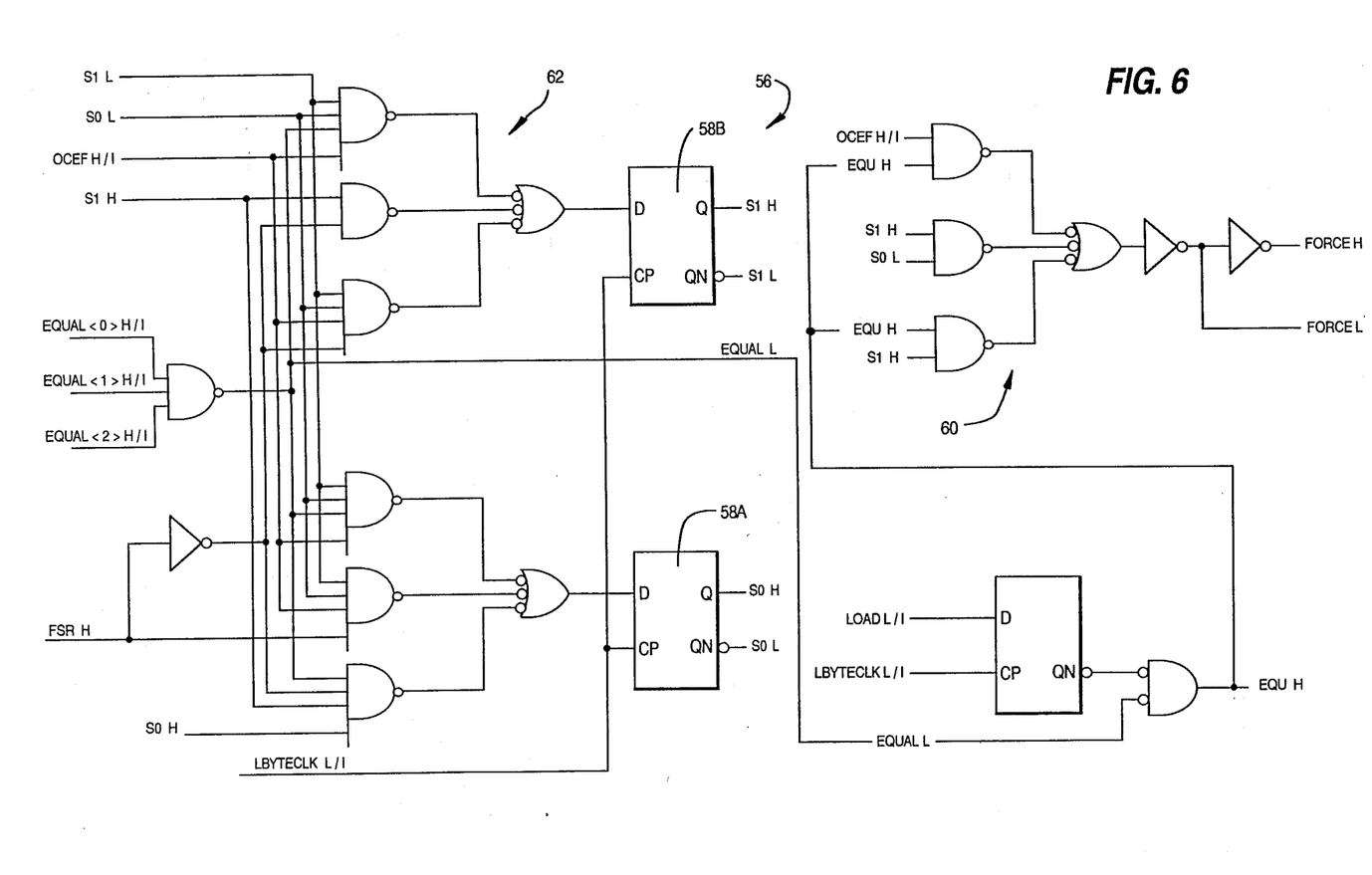
FIG. 6 is a schematic of a force idle state machine.

In the output controller and repeater node of the present invention, means is provided that is coupled to the control means and the transmitting means for transmitting an additional idle byte to the downstream node in response to deassertion of the control signal at times when the equal signal is received indicating the starting delimiter is ready to be output. As embodied herein, the means for transmitting an additional idle byte corresponds to a force idle state machine 56, which is shown in FIG. 6. The functioning of force idle state machine 56 is illustrated in FIG. 7, which is a state diagram for force idle state machine 56.

As shown in FIG. 6, force idle state machine 56 is a four-state machine including flip-flops 58 that provide output force idle state bit signals (S). (In FIG. 6, signal S0 corresponds to the most significant bit, and signal S1 corresponds to the least significant bit.) In order to force output controller 30 to transmit additional idle bytes to the downstream node, a force (F) signal is generated by force idle state machine 56. Force idle state machine 56 includes logic 60 that outputs the force signal in response to the force idle state bit signals from flip-flops 58, the output controller enable flag signal from synchronizer 18, and the equal signal asserted by output pointer 24 to indicate elasticity buffer 20 is ready to provide the first byte (i.e., the starting delimiter) in the subsequent frame. Logic 62 in force idle state machine 56 is provided to set the force idle state bits that will be output by flip-flops 58.

Figure 7:
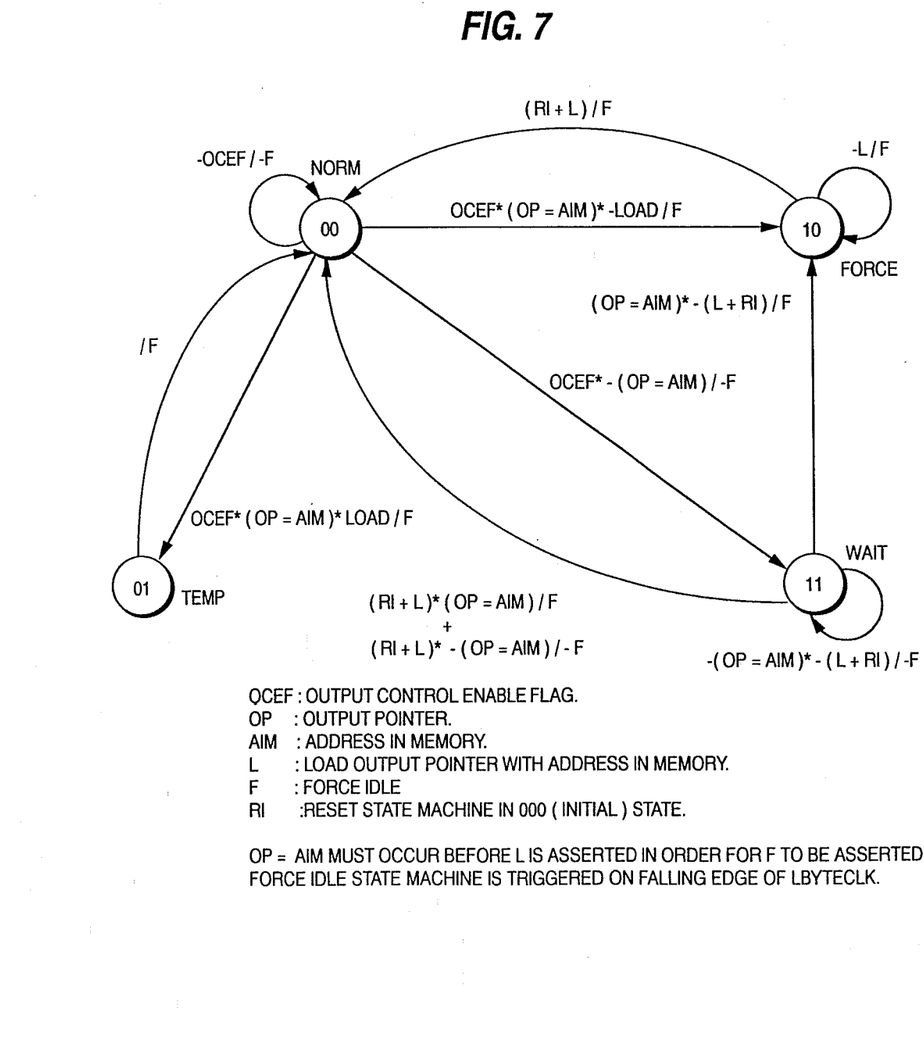
FIG. 7 is a state diagram for a force idle state machine.

As shown by FIG. 7, force idle state machine 56 works in conjunction with reset state machine 48 in order to add idle bytes to the preamble whenever transmission of the first byte in a subsequent frame is delayed because the output idle count signals from output idle counter 38 indicate the number of idle bytes being transmitted to a downstream node is at or below a certain threshold. At times when the OCEF signal is asserted to indicate receipt of the first byte in a subsequent frame, force idle state machine 56 monitors the equal signal to determine whether the elasticity buffer is ready to provide the first byte (i.e., the starting delimiter) in the subsequent frame. Thus, when in normal state 00, logic 60 will assert the force signal if the OCEF signal and the equal signal are both asserted (states 01, and 10). When reset state machine 48 enters its reset state 100, the output pointer load enable signal is asserted and transmission of the starting delimiter of the subsequent frame is enabled. Thus, after the load signal is asserted by reset state machine 48, force idle machine 56 proceeds back to its normal state 00.

Whenever the OCEF signal is asserted to indicate receipt of a starting delimiter for the subsequent frame, but the equal signal is not asserted (indicating the output pointer value does not correspond to the stored input pointer address), force idle state machine 56 proceeds from normal state 00 to wait state 11.

The force signal will not be asserted by force idle state machine 56 when it is in the wait state unless assertion of the equal signal indicates elasticity buffer 20 is ready to provide the starting delimiter. Force idle state machine 56 proceeds from wait state 11 back to normal state 00 if reset state machine 48 enters its reset state 100 (or returns to its initial state 000 because not even one idle byte has been detected). Alternately, force idle state machine 56 proceeds from wait state 11 to force state 10 when elasticity buffer 20 is ready to provide the starting delimiter but reset state machine 48 is not yet in its reset state 100 because transmission of the starting delimiter is being delayed.

Once force idle state machine 56 enters force state 10, it continues to assert the force signal until reset state machine 48 enters its reset state 100 and asserts the load signal (or if reset state machine 56 returns to its initial state because not even one idle byte has been detected).

Force idle state machine 56 can proceed to temporary state 01 when the output pointer value corresponds to the stored input pointer address at the same time that the output pointer load enable signal is being asserted by reset state machine 48. Under these conditions, the force signal is asserted by reset state machine 56 in order to prevent the starting delimiter for the subsequent frame from being output twice.

Figure 8:
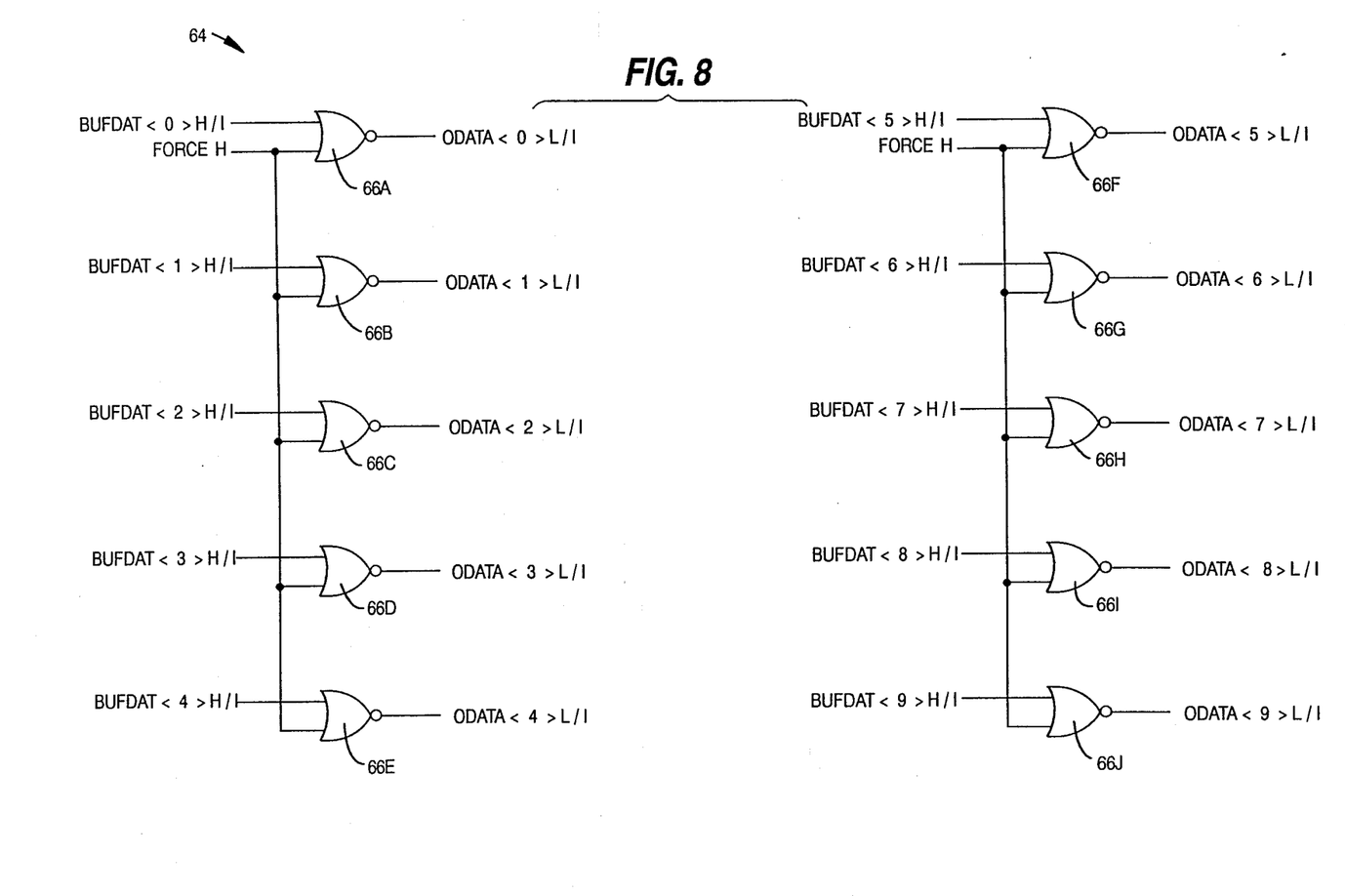
FIG. 8 is a schematic of output logic for an output controller.

A preferred embodiment for output logic 64 for output controller 30 is shown in FIG. 8. Buffer out data from elasticity buffer 20 is input to OR gates 66, each of which also receives the force signal as a second input. OR gates 66 then provide output data to output buffer 28.

Whenever the control means delays transmission of the starting delimiter for a subsequent frame, the force signal is provided by force idle state machine 56 to OR gates 66. This causes the output data provided by output controller 30 to be "forced" into the idle line-state, which in an FDDI network corresponds to the 5-bit code group 11111.

Forcing idle bytes to be provided by output logic 64 adds additional idle bytes to the preamble when transmission of the starting delimiter for the subsequent frame is being delayed. In this manner, the interframe gap is expanded.

It will be apparent to those skilled in the art that various modifications and variations can be made in the output controller and repeater node of the present invention without departing from the scope or spirit of the invention. As an example, the process described may be implemented using other circuit components or even software, the node may be included in various types of data communication systems, and the units used may be bits or symbols instead of bytes. Thus, it is intended that the present invention cover any modifications and variations of this invention provided they come within the scope of the appended claims and their equivalents.

What is claimed is:

1. An output controller in a repeater node for controlling data transfers in a data communication system, the data communication system including a plurality of nodes coupled in a network for transferring frames of data from a source node to a destination node through a plurality of repeater nodes, wherein the repeater node receives a plurality of bytes in a frame from an upstream node, stores the plurality of bytes in an elasticity buffer, and transmits the plurality of bytes in the frame to a downstream node, wherein a last byte of a preceding frame and a starting delimiter for a subsequent frame are separated by a preamble including at least a minimum number of idle bytes, wherein each node in the network is operated by an independent local clock, and wherein the repeater node includes an input controller, the output controller comprising:

means coupled to the elasticity buffer for transmitting bytes to the downstream node in response to a local clock signal;
means coupled to the transmitting means for indicating an idle byte is being transmitted to the downstream node;
means coupled to the idle byte indicating means for counting the number of idle bytes being transmitted to the downstream node;
control means coupled to the counting means and responsive to an indication from the input controller of receipt of the starting delimiter for the subsequent frame, for asserting a control signal to enable transmission of the starting delimiter to the downstream node in response to an idle byte count indicating that more than a threshold number of idle bytes is being transmitted to the downstream node, and for not asserting the control signal to delay transmission of the starting delimiter in response to an idle byte count indicating that the threshold number of idle bytes is being transmitted to the downstream node; and
means coupled to the control means and the transmitting means for transmitting an additional idle byte to the downstream node in response to deassertion of the control signal at times when an equal signal is received indicating the starting delimiter is ready to be output.

2. An output controller in accordance with claim 1 in which the network comprises a token ring.

3. An output controller in accordance with claim 2 in which the network comprises an FDDI network.

4. An output controller in accordance with claim 3 in which the minimum number of idle bytes is six.

5. An output controller in accordance with claim 3 in which the control means comprises a state machine.

6. An output controller in accordance with claim 3 in which the means for transmitting an additional idle byte comprises a state machine.

7. An output controller in accordance with claim 1 in which the control means comprises a state machine.

8. An output controller in accordance with claim 1 in which the means for transmitting an additional idle byte comprises a state machine.

9. An output controller in a repeater node for controlling data transfers in a data communication system, the data communication system including a plurality of nodes coupled in a network for transferring frames of data from a source node to a destination node through a plurality of repeater nodes, wherein the repeater node receives a plurality of bytes in a frame from an upstream node, stores the plurality of bytes in an elasticity buffer, and transmits the plurality of bytes in the frame to a downstream node, wherein a last byte of a preceding frame and a starting delimiter for a subsequent frame are separated by a preamble including at least a minimum number of idle bytes, wherein each node in the network is operated by an independent local clock, and wherein the repeater node includes an input controller, the output controller comprising:

means coupled to the elasticity buffer for transmitting bytes to the downstream node in response to a local clock signal;
means coupled to the transmitting means for indicating an idle byte is being transmitted to the downstream node;
means coupled to the idle byte indicating means for counting the number of idle bytes being transmitted to the downstream node;
control means coupled to the counting means and responsive to an indication from the input controller of receipt of the starting delimiter for the subsequent frame, for asserting a control signal to enable transmission of the starting delimiter to the downstream node in response to an idle byte count indicating that more than a high threshold number of idle bytes is being transmitted to the downstream node, and for not asserting the control signal to delay transmission of the starting delimiter for a first time period in response to an idle byte count indicating that a low threshold number of idle bytes is being transmitted to the downstream node, and for not asserting the control signal to delay transmission of the starting delimiter for a second time period in response to an idle byte count indicating that the high threshold number of idle bytes is being transmitted to the downstream node; and
means coupled to the control means and the transmitting means for transmitting an additional idle byte to the downstream node in response to deassertion of the control signal during the first and second time periods at times when an equal signal is received indicating the starting delimiter is ready to be output.

10. An output controller in accordance with claim 9 in which the network comprises a token ring.

11. An output controller in accordance with claim 10 in which the network comprises an FDDI network.

12. An output controller in accordance with claim 11 in which the minimum number of idle bytes is six.

13. An output controller in accordance with claim 12 in which the low threshold number of idle bytes is six.

14. An output controller in accordance with claim 13 in which the high threshold number of idle bytes is seven.

15. An output controller in accordance with claim 12 in which the high threshold number of idle bytes is seven.

16. An output controller in accordance with claim 11 in which the control means comprises a state machine.

17. An output controller in accordance with claim 11 in which the means for transmitting an additional idle byte comprises a state machine.

18. An output controller in accordance with claim 9 in which the control means comprises a state machine.

19. An output controller in accordance with claim 9 in which the means for transmitting an additional idle byte comprises a state machine.

20. A repeater node in a data communication system including a plurality of nodes coupled in a network for transferring frames of data from a source node to a destination node through the repeater node, wherein the repeater node receives a plurality of bytes in a frame from an upstream node and transmits the plurality of bytes in the frame to a downstream node, wherein a last byte of a preceding frame and a starting delimiter for a subsequent frame are separated by a preamble including at least a minimum number of idle bytes, and wherein each node in the network is operated by an independent local clock, the repeater node comprising:
  means for generating a local clock signal;
  means for receiving a byte transmitted from the upstream node;
  input controller means coupled to the receiving means for indicating receipt of the starting delimiter for the subsequent frame;
  elasticity buffer means, coupled to the receiving means and including a number of storage elements, for storing a number of bytes received from the upstream node, and for sequentially outputting each stored byte in first-in, first-out order in response to the local clock signal;
  means coupled to the elasticity buffer means for transmitting bytes to the downstream node in response to the local clock signal;
  means coupled to the transmitting means for indicating an idle byte is being transmitted to the downstream node;
  means coupled to the idle byte indicating means for counting the number of idle bytes being transmitted to the downstream node;
  means coupled to the elasticity buffer means for providing an equal signal to indicate the starting delimiter for the subsequent frame is ready to be output;
  control means coupled to the counting means and the input controller means, and responsive to receipt of the starting delimiter for the subsequent frame, for asserting a control signal to enable transmission of the starting delimiter to the downstream node in response to an idle byte count indicating that more than a threshold number of idle bytes is being transmitted to the downstream node, and for not asserting the control signal to delay transmission of the starting delimiter in response to an idle byte count indicating that the threshold number of idle bytes is being transmitted to the downstream node; and
  means coupled to the control means and the transmitting means for transmitting an additional idle byte to the downstream node in response to deassertion of the control signal at times when the equal signal is received indicating the starting delimiter is ready to be output.

21. A repeater node in accordance with claim 20 in which the network comprises a token ring.

22. A repeater node in accordance with claim 21 in which the network comprises an FDDI network.

23. A repeater node in accordance with claim 22 in which the minimum number of idle bytes is six.

24. A repeater node in accordance with claim 22 in which the control means comprises a state machine.

25. A repeater node in accordance with claim 22 in which the means for transmitting an additional idle byte comprises a state machine.

26. A repeater node in accordance with claim 20 in which the control means comprises a state machine.

27. A repeater node in accordance with claim 20 in which the means for transmitting an additional idle byte comprises a state machine.

28. A repeater node in a data communication system including a plurality of nodes coupled in a network for transferring frames of data from a source node to a destination node through the repeater node, wherein the repeater node receives a plurality of bytes in a frame from an upstream node and transmits the plurality of bytes in the frame to a downstream node, wherein a last byte of a preceding frame and a starting delimiter for a subsequent frame are separated by a preamble including at least a minimum number of idle bytes, and wherein each node in the network is operated by an independent local clock, the repeater node comprising:
  means for generating a local clock signal;
  means for receiving a byte transmitted from the upstream node;
  input controller means coupled to the receiving means for indicating receipt of the starting delimiter for the subsequent frame;
  elasticity buffer means, coupled to the receiving means and including a number of storage elements, for storing a number of bytes received from the upstream node, and for sequentially outputting each stored byte in first-in, first-out order in response to the local clock signal;
  means coupled to the elasticity buffer means for transmitting bytes to the downstream node in response to the local clock signal;
  means coupled to the transmitting means for indicating an idle byte is being transmitted to the downstream node;
  means coupled to the idle byte indicating means for counting the number of idle bytes being transmitted to the downstream node;
  means coupled to the elasticity buffer means for providing an equal signal to indicate the starting delimiter for the subsequent frame is ready to be output;
  control means coupled to the counting means and the input controller means, and responsive to receipt of the starting delimiter for the subsequent frame, for asserting a control signal to enable transmission of the starting delimiter to the downstream node in response to an idle byte count indicating that more than a high threshold number of idle bytes is being transmitted to the downstream node, for not asserting the control signal to delay transmission of the starting delimiter for a first time period in response to an idle byte count indicating that a low threshold number of idle bytes is being transmitted to the downstream node, and for not asserting the control signal to delay transmission of the starting delimiter for a second time period in response to an idle byte count indicating that the high threshold number of idle bytes is being transmitted to the downstream node; and means coupled to the control means and the transmitting means for transmitting an additional idle byte to the downstream node in response to deassertion of the control signal during the first and second time periods at times when the equal signal is received indicating the starting delimiter is ready to be output.

29. A repeater node in accordance with claim 28 in which the network comprises a token ring.

30. A repeater node in accordance with claim 29 in which the network comprises an FDDI network.

31. A repeater node in accordance with claim 30 in which the minimum number of idle bytes is six.

32. A repeater node in accordance with claim 31 in which the low threshold number of idle bytes is six.

33. A repeater node in accordance with claim 32 in which the high threshold number of idle bytes is seven.

34. A repeater node in accordance with claim 31 in which the high threshold number of idle bytes is seven.

35. A repeater node in accordance with claim 30 in which the control means comprises a state machine.

36. A repeater node in accordance with claim 30 in which the means for transmitting an additional idle byte comprises a state machine.

37. A repeater node in accordance with claim 28 in which the control means comprises a state machine.

38. A repeater node in accordance with claim 28 in which the means for transmitting an additional idle byte comprises a state machine.

39. A method for controlling data transfers in a data communication system, the data communication system including a plurality of nodes coupled in a network for transferring frames of data from a source node to a destination node through a plurality of repeater nodes, wherein a repeater node receives a plurality of bytes in a frame from an upstream node, stores the plurality of bytes in an elasticity buffer, and transmits the plurality of bytes in the frame to a downstream node, wherein a last byte of a preceding frame and a starting delimiter for a subsequent frame are separated by a preamble including at least a minimum number of idle bytes, and wherein each node in the network is operated by an independent local clock, the method performed by an output controller in the repeater node comprising:

transmitting bytes to the downstream node in response to a local clock signal;

indicating an idle byte is being transmitted to the downstream node;

counting the number of idle bytes being transmitted to the downstream node;

asserting a control signal after receipt of the starting delimiter for the subsequent frame to enable transmission of the starting delimiter to the downstream node in response to an idle byte count indicating that more than a threshold number of idle bytes is being transmitted to the downstream node;

delaying assertion of the control signal after receipt of the starting delimiter for the subsequent frame to delay transmission of the starting delimiter in response to an idle byte count indicating that the threshold number of idle bytes is being transmitted to the downstream node; and transmitting an additional idle byte to the downstream node in response to deassertion of the control signal at times when an equal signal is received indicating the starting delimiter is ready to be output.

40. A method in accordance with claim 39 in which the network comprises a token ring.

41. A method in accordance with claim 40 in which the network comprises an FDDI network.

42. A method in accordance with claim 41 in which the minimum number of idle bytes is six.

43. A method for controlling data transfers in a data communication system, the data communication system including a plurality of nodes coupled in a network for transferring frames of data from a source node to a destination node through a plurality of repeater nodes, wherein a repeater node receives a plurality of bytes in a frame from an upstream node, stores the plurality of bytes in an elasticity buffer, and transmits the plurality of bytes in the frame to a downstream node, wherein a last byte of a preceding frame and a starting delimiter for a subsequent frame are separated by a preamble including at least a minimum number of idle bytes, and wherein each node in the network is operated by an independent local clock, the method performed by an output controller in the repeater node comprising:

transmitting bytes to the downstream node in response to a local clock signal;

indicating an idle byte is being transmitted to the downstream node;

counting the number of idle bytes being transmitted to the downstream node;

asserting a control signal after receipt of the starting delimiter for the subsequent frame to enable transmission of the starting delimiter to the downstream node in response to an idle byte count indicating that more than a high threshold number of idle bytes is being transmitted to the downstream node;

delaying assertion of the control signal after receipt of the starting delimiter for the subsequent frame to delay transmission of the starting delimiter for a first time period in response to an idle byte count indicating that a low threshold number of idle bytes is being transmitted to the downstream node;

delaying assertion of the control signal after receipt of the starting delimiter for the subsequent frame to delay transmission of the starting delimiter for a second time period in response to an idle byte count indicating that the high threshold number of idle bytes is being transmitted to the downstream node; and transmitting an additional idle byte to the downstream node in response to deassertion of the control signal during the first and second time periods at times when an equal signal is received indicating the starting delimiter is ready to be output.

44. A method in accordance with claim 43 in which the network comprises a token ring.

45. A method in accordance with claim 44 in which the network comprises an FDDI network.

46. A method in accordance with claim 45 in which the minimum number of idle bytes is six.

47. A method in accordance with claim 46 in which the low threshold number of idle bytes is six.

48. A method in accordance with claim 47 in which the high threshold number of idle bytes is seven.

49. A method in accordance with claim 46 in which the high threshold number of idle bytes is seven.

50. A method for controlling data transfers in a data communication system, the data communication system including a plurality of nodes coupled in a network for transferring frames of data from a source node to a destination node through a plurality of repeater nodes, wherein a repeater node receives a plurality of bytes in a frame from an upstream node and transmits the plurality of bytes in the frame to a downstream node, wherein a last byte of a preceding frame and a starting delimiter for a subsequent frame are separated by a preamble including at least a minimum number of idle bytes, and wherein each node in the network is operated by an independent local clock, the method performed by the repeater node comprising:

generating a local clock signal;
receiving a byte transmitted from the upstream node;
indicating receipt of the starting delimiter for the subsequent frame;
storing a number of bytes received from the upstream node in an elasticity buffer including a number of storage elements;
sequentially outputting each stored byte in first-in, first-out order from the elasticity buffer in response to the local clock signal;
transmitting bytes to the downstream node in response to the local clock signal;
indicating an idle byte is being transmitted to the downstream node;
counting the number of idle bytes being transmitted to the downstream node;
providing an equal signal to indicate the starting delimiter for the subsequent frame is ready to be output;
asserting a control signal after receipt of the starting delimiter for the subsequent frame to enable transmission of the starting delimiter to the downstream node in response to an idle byte count indicating that more than a threshold number of idle bytes is being transmitted to the downstream node;
delaying assertion of the control signal after receipt of the starting delimiter for the subsequent frame to delay transmission of the starting delimiter in response to an idle byte count indicating that the threshold number of idle bytes is being transmitted to the downstream node; and
transmitting an additional idle byte to the downstream node in response to deassertion of the control signal at times when the equal signal is received indicating the starting delimiter is ready to be output.

51. A method in accordance with claim 50 in which the network comprises a token ring.

52. A method accordance with claim 51 in which the network comprises an FDDI network.

53. A method in accordance with claim 52 in which the minimum number of idle bytes is six.

54. A method for controlling data transfers in a data communication system, the data communication system including a plurality of nodes coupled in a network for transferring frames of data from a source node to a destination node through a plurality of repeater nodes, wherein a repeater node receives a plurality of bytes in a frame from an upstream node and transmits the plurality of bytes in the frame to a downstream node, wherein a last byte of a preceding frame and a starting delimiter for a subsequent frame are separated by a preamble including at least a minimum number of idle bytes, and wherein each node in the network is operated by an independent local clock, the method performed by the repeater node comprising:

generating a local clock signal;
receiving a byte transmitted from the upstream node;
indicating receipt of the starting delimiter for the subsequent frame;
storing a number of bytes received from the upstream node in an elasticity buffer including a number of storage elements;
sequentially outputting each stored byte in first-in, first-out order from the elasticity buffer in response to the local clock signal;
transmitting bytes to the downstream node in response to the local clock signal;
indicating an idle byte is being transmitted to the downstream node;
counting the number of idle bytes being transmitted to the downstream node;
providing an equal signal to indicate the starting delimiter for the subsequent frame is ready to be output;
asserting a control signal after receipt of the starting delimiter for the subsequent frame to enable transmission of the starting delimiter to the downstream node in response to an idle byte count indicating that more than a high threshold number of idle bytes is being transmitted to the downstream node;
delaying assertion of the control signal after receipt of the starting delimiter for the subsequent frame to delay transmission of the starting delimiter for a first time period in response to an idle byte count indicating that a low threshold number of idle bytes is being transmitted to the downstream node;
delaying assertion of the control signal after receipt of the starting delimiter for the subsequent frame to delay transmission of the starting delimiter for a second time period in response to an idle byte count indicating that the high threshold number of idle bytes is being transmitted to the downstream node; and
transmitting an additional idle byte to the downstream node in response to deassertion of the control signal during the first and second time periods at times when the equal signal is received indicating the starting delimiter is ready to be output.

55. A method in accordance with claim 54 in which the network comprises a token ring.

56. A method in accordance with claim 55 in which the network comprises an FDDI network.

57. A method in accordance with claim 56 in which the minimum number of idle bytes is six.

58. A method in accordance with claim 57 in which the low threshold number of idle bytes is six.

59. A method in accordance with claim 58 in which the high threshold number of idle bytes is seven.

60. A method in accordance with claim 57 in which the high threshold number of idle bytes is seven.

* * * * *